US012603874B2

(12) United States Patent
Woodworth et al.

(10) Patent No.: US 12,603,874 B2
(45) Date of Patent: Apr. 14, 2026

(54) SYSTEMS AND METHODS FOR CUSTOMER CONTROL OF EDGE SERVICE

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 18/651,125

(22) Filed: Apr. 30, 2024

(65) Prior Publication Data

US 2024/0372846 A1 Nov. 7, 2024

Related U.S. Application Data

(60) Provisional application No. 63/500,402, filed on May 5, 2023.

(51) Int. Cl.
H04L 12/66 (2006.01)
H04L 9/40 (2022.01)
(52) U.S. Cl.
CPC .............. H04L 63/08 (2013.01); H04L 12/66 (2013.01)
(58) Field of Classification Search
CPC ................................ H04L 63/08; H04L 12/66
See application file for complete search history.

(56) References Cited

U.S. PATENT DOCUMENTS

| | | | | |
|---|---|---|---|---|
| 2003/0135625 A1* | 7/2003 | Fontes | ................ | H04L 63/1458 709/228 |
| 2006/0262773 A1* | 11/2006 | Tanimoto | ............ | H04L 12/4625 370/351 |
| 2006/0268934 A1* | 11/2006 | Shimizu | .................. | H04L 45/50 370/473 |
| 2014/0258461 A1* | 9/2014 | L'Heureux | ......... | H04L 63/0464 709/219 |
| 2014/0310429 A1* | 10/2014 | L'Heureux | ............. | H04L 67/02 709/249 |
| 2017/0063798 A1* | 3/2017 | Lapidous | ................ | H04L 63/20 |
| 2017/0085500 A1* | 3/2017 | Patney | .................... | H04L 49/25 |
| 2017/0351471 A1* | 12/2017 | Passeri | .................... | G06F 3/033 |
| 2017/0353516 A1* | 12/2017 | Gordon | .................... | H04L 65/80 |
| 2023/0006889 A1* | 1/2023 | Thyagaturu | ......... | H04L 41/5054 |

OTHER PUBLICATIONS

International Search Report and Written Opinion of the International Searching Authority, dated Oct. 15, 2024, Int'l Appl. No. PCT/2024/027071, Int'l Filing Date Apr. 30, 2024; 18 pgs.

* cited by examiner

*Primary Examiner* — Minh Chau Nguyen

(57) ABSTRACT

In a network including a wide area network and a local area network, an edge server may be within the wide area network and geographically close to a customer device of the local area network. Such an edge server may be vulnerable to attacks, such as distributed denial of service attacks, including SYN floods. Systems and methods for customer control of edge service are provided while mitigating such attacks.

14 Claims, 7 Drawing Sheets

FIG. 2C

242 — Receive a TCP connection request, from a first device, on the wide area network 244 — Determine that the TCP connection request is related to a second device, on the local area network 246 — Cause to be created a first TCP connection between the network switching device and the first device and a second TCP connection between the network switching device and the second device 248 — Receive a request to download an application 250 — Request permission from a user to download the application 252 — Download the application 254 — Authenticate the application 256 — Receive a second TCP connection request, from a third device, on the wide area network, related to a fourth device, on the local area network 258 — Establish a third TCP connection, with the third device 260 — Establish a fourth TCP connection, with the fourth device 262 — Operate as a proxy for forwarding packets exchanged between the third device and the fourth device 264 — Provide a service, to the second device, the service being selected from the group consisting of a DNS, a DHCP service, a time service, a SIP service, an LDAP service, and a VPN service 266 — Enforce a bandwidth limit in the first TCP connection, between the network switching device and the first device, and in the second TCP connection, between the network switching device and the second device

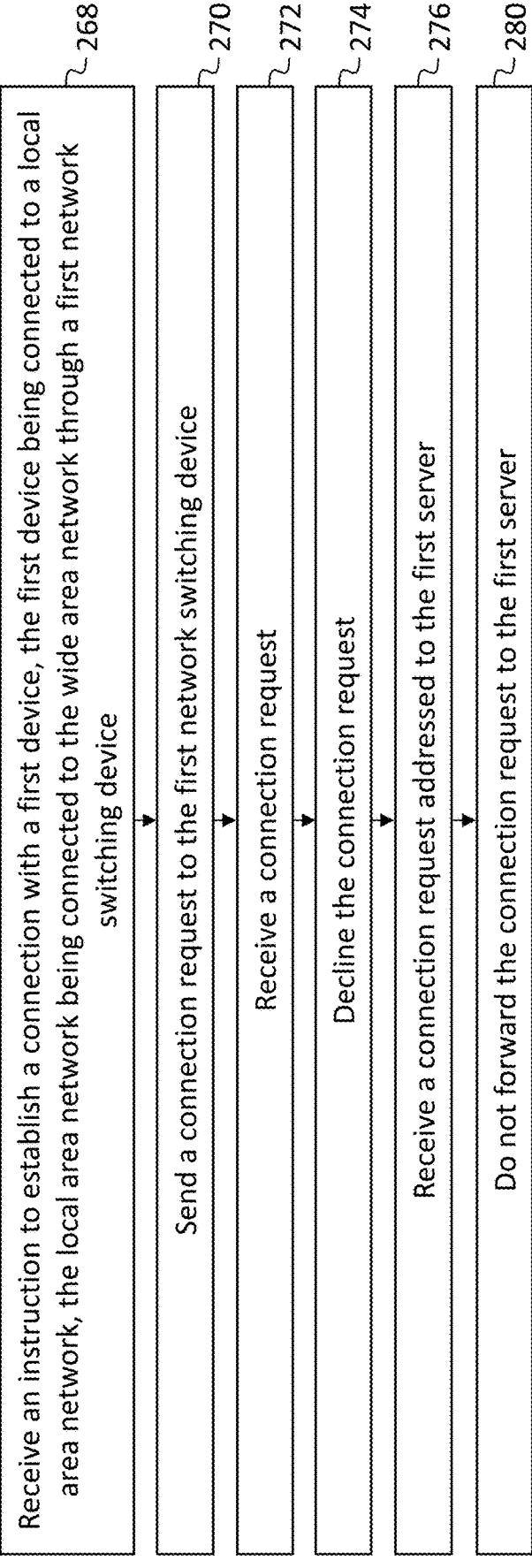

Receive an instruction to establish a connection with a first device, the first device being connected to a local area network, the local area network being connected to the wide area network through a first network switching device ⟩ 268

Send a connection request to the first network switching device ⟩ 270

Receive a connection request ⟩ 272

Decline the connection request ⟩ 274

Receive a connection request addressed to the first server ⟩ 276

Do not forward the connection request to the first server ⟩ 280

FIG. 2D

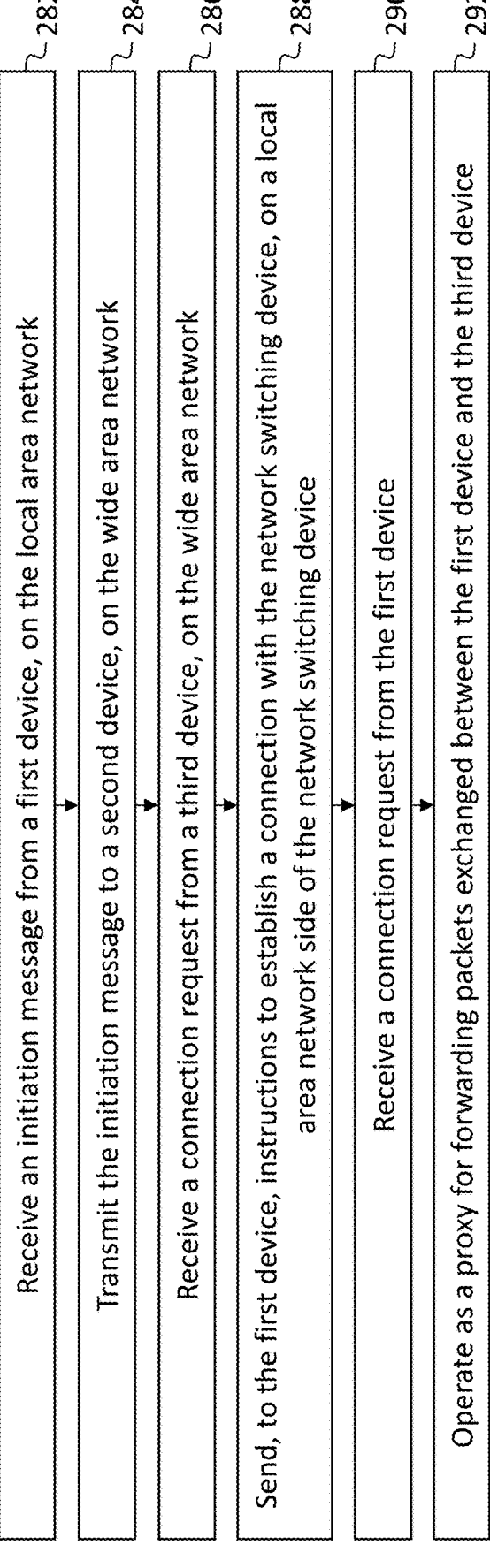

282 — Receive an initiation message from a first device, on the local area network 284 — Transmit the initiation message to a second device, on the wide area network 286 — Receive a connection request from a third device, on the wide area network 288 — Send, to the first device, instructions to establish a connection with the network switching device, on a local area network side of the network switching device 290 — Receive a connection request from the first device 292 — Operate as a proxy for forwarding packets exchanged between the first device and the third device

FIG. 2E

SYSTEMS AND METHODS FOR CUSTOMER CONTROL OF EDGE SERVICE

CROSS-REFERENCE TO RELATED APPLICATIONS

This application claims the benefit of U.S. Provisional Application No. 63/500,402 filed May 5, 2023, entitled "Systems and Methods for Customer Control of Edge Service," which is incorporated herein by reference in its entirety.

FIELD

One or more aspects of embodiments according to the present disclosure relate to networks, and more particularly to systems and methods for customer control of edge service.

BACKGROUND

In a network including a wide area network and a local area network, an edge server may be within the wide area network and geographically close to a customer device of the local area network. Such an edge server may be vulnerable to attacks, such as distributed denial of service attacks.

It is with respect to this general technical environment that aspects of the present disclosure are related.

SUMMARY

In an aspect, a system is provided, comprising a network switching device operably connected to a wide area network and to a local area network. In examples, the network switching device comprises: at least one processing circuit; and memory, operatively connected to the at least one processing circuit and storing instructions that, when executed by the at least one processing circuit, cause the system to perform a method. In examples, the method comprises: receiving a transmission control protocol (TCP) connection request, from a first device, on the wide area network; determining that the TCP connection request is related to a second device, on the local area network; and in response to the TCP connection request: causing a first TCP connection to be created between the network switching device and the first device; and causing a second TCP connection to be created between the network switching device and the second device.

In examples, the method further comprises: receiving a request to download an application; and downloading the application.

In examples, the method further comprises receiving the request to download the application from a third device, on the local area network.

In examples, the method further comprises receiving the request to download the application from a third device, on the wide area network.

In examples, the method further comprises authenticating, by the network switching device, the application.

In examples, the method further comprises requesting, by the network switching device, permission from a user to download the application.

In examples, the method further comprises downloading, by the network switching device, the application from a set address on the wide area network.

In examples, the method further comprises: receiving a second TCP connection request, from a third device, on the wide area network, related to a fourth device, on the local area network, causing a third TCP connection to be established with the third device, causing a fourth TCP connection to be established with the fourth device, and operating as a proxy for forwarding packets exchanged between the third device and the fourth device.

In examples, the first TCP connection, between the network switching device and the first device, uses a first port of the network switching device, the first port corresponding to the second device; and the third TCP connection uses a second port of the network switching device, the second port corresponding to the fourth device, the second port being different from the first port. In examples, the third device is the same device as the first device.

In examples, the method further comprises providing a service, by the network switching device to the second device, the service being selected from the group consisting of a Domain Name Service (DNS), a Dynamic Host Configuration Protocol (DHCP) service, a time service, a Session Initiation Protocol (SIP) service, a Lightweight Directory Access Protocol (LDAP) service, and a Virtual Private Network (VPN) service.

In examples, the method further comprises enforcing, by the network switching device, a bandwidth limit in the first TCP connection, between the network switching device and the first device, and in the second TCP connection, between the network switching device and the second device.

In another aspect, a system is provided, comprising: a first server, the first server being connected to a wide area network and comprising at least one processing circuit; and memory, operatively connected to the at least one processing circuit and storing instructions that, when executed by the at least one processing circuit, cause the system to perform a method. In examples, the method comprises receiving an instruction to establish a connection with a first device, the first device being connected to a local area network, the local area network being connected to the wide area network through a first network switching device; and sending a connection request to the first network switching device.

In examples, the instruction comprises a port identifier identifying a first port of the first network switching device, and the connection request is addressed to the first port.

In examples, the method further comprises: receiving, at the first server, an incoming connection request, and declining the connection request irrespective of a source of the connection request.

In examples, the system further comprises further comprising a second network switching device, within the wide area network, communicatively connected to the first server, the second network switching device being configured to: receive a connection request addressed to the first server, and not forward the connection request to the first server irrespective of a source of the connection request.

In another aspect, a system is provided, comprising: a network switching device operably connected to a wide area network and to a local area network, the network switching device comprising at least one processing circuit; and memory, operatively connected to the at least one processing circuit and storing instructions that, when executed by the at least one processing circuit, cause the system to perform a method. In examples, the method comprises receiving an initiation message from a first device, on the local area network; transmitting the initiation message to a second device, on the wide area network, wherein the second device is a registration server; receiving a first connection request for the first device from a third device, on the wide area network; and in response to the connection request, sending, to the first device, instructions to establish a second connection with the network switching device, on a local area network side of the network switching device.

In examples, the third device is an edge server.

In examples, the method further comprises: enforcing, by the network switching device, a bandwidth limit in between the network switching device and the third device and between the network switching device and the first device.

In examples, the method further comprises: receiving a second connection request from the first device; and operating as a proxy for forwarding packets exchanged between the first device and the third device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings. Non-limiting and non-exhaustive examples are described with reference to the following Figures.

FIG. 2C is a flow chart of a method, according to an example of the present disclosure;

FIG. 2D is a flow chart of a method, according to an example of the present disclosure;

FIG. 2E is a flow chart of a method, according to an example of the present disclosure.

DETAILED DESCRIPTION

The detailed description set forth below in connection with the appended drawings is intended as a description of exemplary embodiments of systems and methods for customer control of edge service provided in accordance with the present disclosure and is not intended to represent the only forms in which the present disclosure may be constructed or utilized.

In the following detailed description, references are made to the accompanying drawings that form a part hereof, and in which are shown by way of illustrations specific examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Figure 1:
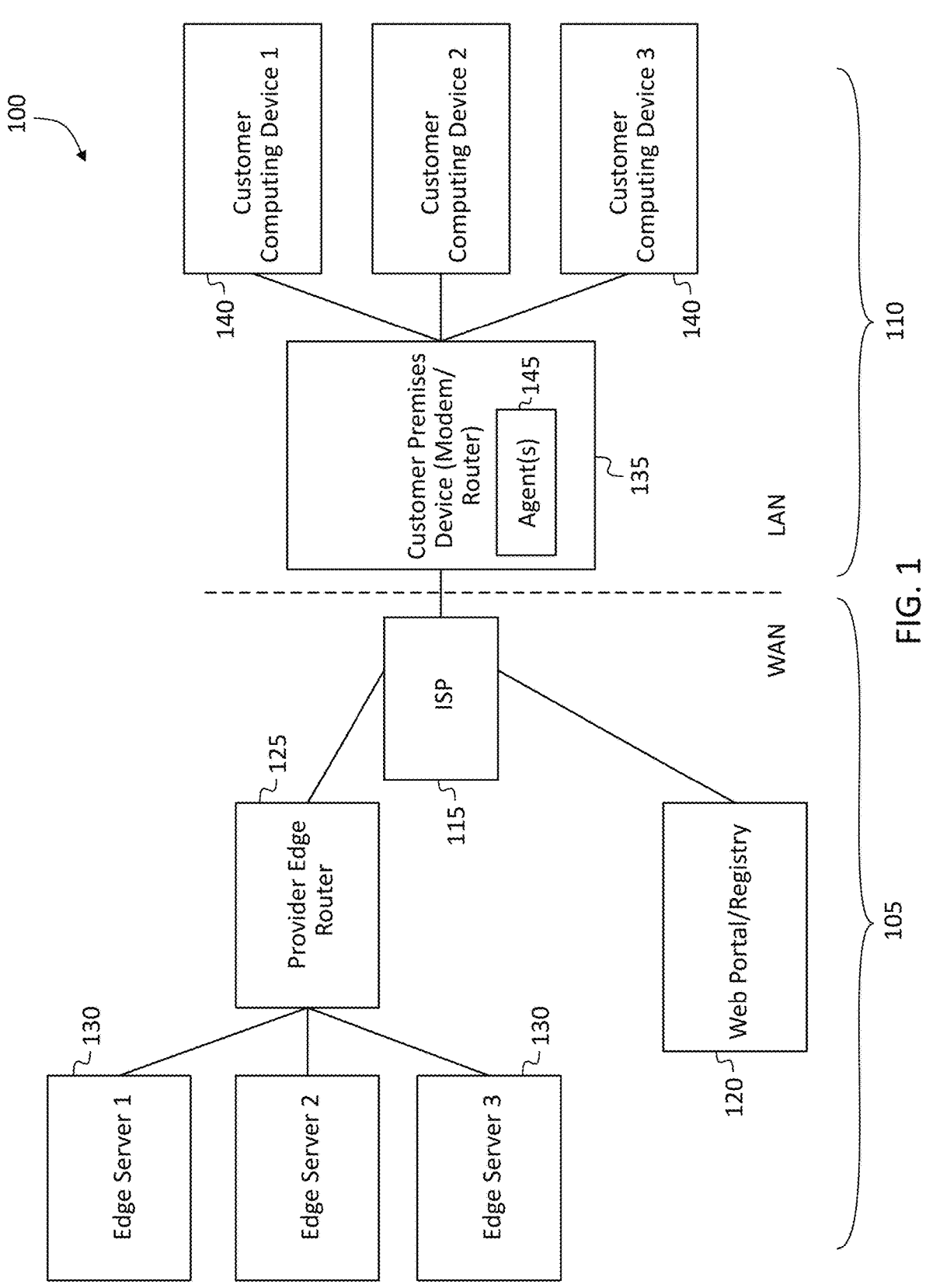
FIG. 1 is a block diagram of a network, according to an example of the present disclosure.

FIG. 1 depicts a network 100, in some examples. The network includes a wide area network (WAN) 105 (e.g., the internet) and a local area network (LAN) 110 (e.g., a home network, or a network in a commercial facility such as an office or a factory, etc.). The wide area network 105 may include an internet service provider (ISP) 115, and various devices and systems such as a web portal or registry (or "registration server") 120, a provider edge router (or simply "edge router") 125, and one or more edge servers 130. The local area network 110 may include a customer premises network switching device (or "local area network router" or "customer premises device (modem/router)") 135, and one or more customer devices (e.g., customer computing devices) 140.

Each of the customer devices 140 may be an internet-capable device, e.g., a computing device (such as a laptop computer or tablet computer) or an Internet of Things (IoT) device, such as an internet-capable appliance (e.g., a security camera, a refrigerator, or a thermostat). In some examples, corresponding to a first mode of operation, when such a customer device 140 is first installed or powered up, it may contact a central server such as the registration server 120 and receive instructions for establishing contact with an edge server 130 that is geographically near the customer device 140. It may then send a connection request (e.g., a SYN packet in a TCP connection example) to the edge server 130, set up a connection with the edge server 130, and begin using one or more services provided by the edge server 130 (e.g., services such as data storage, edge computing, or providing an internet-accessible interface to a user).

For example, in order to establish a TCP connection, the two devices (e.g., the customer device 140 and the edge server 130) need to exchange some basic information. This includes the IP addresses and port numbers of the devices, as well as some additional information that is used to ensure that the connection is properly established and that the data is transmitted reliably.

The first step in establishing a TCP connection is for one of the devices, known as the client (e.g., the customer device 140), to send a packet to the other device, known as the server (e.g., the edge server 130), requesting that a connection be established. This packet, known as the SYN packet, contains the IP address and port number of the client as well as a randomly generated number called the Initial Sequence Number (ISN).

The server (here, edge server 130) then responds with its own SYN packet, which contains its own IP address and port number as well as its own ISN. This packet also contains an acknowledgement of the client's ISN, which is used to verify that the client has received the server's SYN packet (this is known as a SYN/ACK message). The client also provides an acknowledgement of receiving the client's ISN.

Once both devices have exchanged SYN packets and acknowledgements in what is sometimes referred to as a TCP three-way handshake, the connection is established and they can begin sending data to each other. The devices will also continue to exchange additional packets to ensure that the data is transmitted reliably and that any lost or corrupted packets are re-sent.

In examples, the edge servers 130 may be vulnerable to attack (e.g., from malicious code on the customer device 140 seeking to probe vulnerabilities on the edge server 130). For example, a SYN flood is a form of denial-of-service attack in which an attacker rapidly initiates a connection to a server without finalizing the connection. The server then has to spend resources waiting for half open connections, which can affect the responsiveness of the server to legitimate requests.

In some examples herein, therefore, when a customer device 140 first seeks services provided by an edge server 130, a connection is initiated by the edge server 130 to a local area network router 135, and the local area network router 135 establishes a separate connection to the customer device 140. In this manner, the customer device 140 is unaware of the particular edge server 130 providing the service, as the end point for its connection is the local area network router 135. This can insulate the edge server(s) 130 from malicious code operating on customer device 140, since customer device 140 is unaware of the edge server(s) 130. In such an example, when the customer device 140 is first installed or powered up, it may contact (e.g., send an initialization message to) the registration server 120, which may send, to an edge server 130 that is geographically near the customer device 140, instructions to initiate a connection with the local area network router 135 for the customer device 140. The instructions may include an Internet Protocol (IP) address for the local area network router 135 and a port number that the local area network router 135 associates with the customer device 140, which the registration server 120 may determine (and provide to the edge server 130) from the header of the initialization message. The edge server 130 may then send a connection request, to the local area network router 135, and the local area network router 135 may establish a first connection, with the edge server 130.

As discussed, the instructions sent by the registration server 120 to the edge server 130 may include a WAN-side port of the local area network router 135 that is to be used for the connection. In examples, the specified port is associated by the local area network router 135 with the customer device 140. For example, when the initialization message is sent from the customer device 140 to the registration server 120, the local area network router may associate a WAN-side port with the customer device 140 and include that WAN-side port in a header of the initialization message provided to the registration server 120. The registration server 120 can then communicate that WAN-side port number (and the IP address of the local area network 135) to the edge server 130, along with the instructions to initiate a connection between the edge server 130 and the local area network router 135. The edge server 130 and the local area network router 135 (i.e., the first connection) may then use this port of the local area network router 135 during the TCP connection process. If additional connections are made for communications with additional customer devices 140, such connections may use different WAN-side ports of the local area network router 135. The local area network router 135 may then maintain a mapping of the WAN-side port associated with a particular customer device 140, and proxy messages received via that WAN-side port to a separate connection between the local area network router 135 and that customer device 140. Similarly, the local area network router 135 may proxy messages received from the customer device 140 via the connection to the edge server 130 over the particular WAN-side port associated with that customer device 140.

Various measures may be taken to thwart an attack in which each of a plurality of compromised devices mimics a legitimate customer device 140 and sends a respective initialization message to the registration server 120. For example, the registration server 120 may verify that an identifying number (e.g., an identifying number (e.g., a serial number) that the customer device 140 may include, when it contacts the registration server 120, or the media access control (MAC) address that is transmitted by the customer device 140) is within a set of such identifying numbers with which such customer devices 140 have been manufactured, and that the identifying number is not one that has been used recently in an initialization message. In some examples, further information that is more stateful is kept to help with thwarting such attacks.

The local area network router 135 may send the customer device 140 instructions, instructing it to establish a connection at an address (e.g., an Internet Protocol (IP) address) and a port that comprise an address and LAN-side port of the local area network router 135 on the local area network. If an application (for generating such instructions, discussed in further detail below) is already installed on the local area network router 135, then the local area network router 135 may act in response to the initialization message. Otherwise the local area network router 135 may wait until it has the application installed (as discussed in further detail below) and receives a connection request from the edge server 130. Such a process allows for proxy installations, which may be light, or "thin," clients on the proxy devices.

The local area network router 135 may be capable of generating such instructions as a result of the application, which may run on the local area network router 135, and which may be capable of generating such instructions as a programmed-in capability (e.g., a capability specific to the particular customer device 140 being instructed). In other examples, the local area network router 135 may include a generic capability to receive parameters or instructions from a registration server 120 and to generate, based on such parameters or instructions, instructions for the customer device 140. In response to receiving the instructions, the customer device 140 may transmit a corresponding connection request. This connection request may be terminated by the local area network router 135, which may establish a second connection (in addition to the first connection established with the edge server 130), with the customer device 140. In some examples, the local area network router 135 may instead initiate a connection with the customer device 140 (e.g., by sending an SYN message as a first message in the TCP three-way handshake). Once both the first connection and the second connection are established, the local area network router 135 may operate as a proxy, forwarding packets (e.g., Ethernet frames) from the customer device 140 to the edge server 130, and forwarding packets from the edge server 130 to the customer device 140.

The customer device 140 may operate in the same manner as it would if it had a direct connection (without an intervening proxy) to the edge server 130 initiated by the customer device 140; as such, the presence of the proxy may be transparent to the customer device 140, and the customer device 140 need not be specifically designed or configured to operate with a connection between the edge server 130 and the local area network router 135. Rather, the customer device 140 is provided with an IP address that, for its purposes, it considers to be the edge server 130, but is actually an IP address of the local area network router 135.

In such an example, the edge server 130 may provide services to customer devices 140 without first accepting any inbound connections. As such, the server may be configured to filter (e.g., decline) all inbound connection requests, reducing its vulnerability to attacks and probing for vulnerabilities. In some examples, the filtering may be performed by the edge router 125, which may drop (e.g., not forward) any inbound connection requests addressed to the edge server 130, such as the initial SYN message in a TCP three-way handshake. In some examples, the local area network router 135 may initiate the connection with the edge server 130. In such an example the local area network router 135 may include, with the connection request, authentication information (e.g., the connection request may include a signed payload), and, to reduce its vulnerability to attacks, the edge server 130 may authenticate the connection request and perform no further action with respect to the request if the authentication is not successful. Although systems and methods described herein may be described with respect to a TCP three-way handshake connection process, other connection protocols may be used. For example, present systems and methods may be useful with any connection protocol in which a computing device may be subject to attack from a malicious actor seeking to cause the computing device to expend resources waiting for partially completed connection sequence to finish.

The capability to establish a proxy connection as described above may be present in the local area network router 135 as a result of software or firmware installed in the local area network router 135 at the time of manufacture, or as a result of software or firmware downloaded to it subsequently. In addition, updates to the application to enable the local area network router 135 to act as a proxy may be downloaded and installed, as needed or desired. For example, the local area network router 135 may have installed on it one or more applications, each configured to enable the local area network router 135 to participate, as described above, as a proxy between a respective kind of customer device 140 and an edge server 130. For example, the local area network router 135 may have installed on it a first application for establishing connections with thermostats produced by a first manufacturer, and a second application for establishing connections with security cameras produced by a second manufacturer. Some of the applications installed on the local area network router 135 may be suitable for use with multiple different kinds of customer devices 140 (e.g., different customer devices 140 produced by the same manufacturer, or different customer devices 140 produced by different manufacturers following an agreed-upon standard).

Applications may be installed on the local area network router 135 as a result of user action (e.g., a request from a user, via a customer device 140 (e.g., a customer computing device) to install an application). For example, when configuring (e.g., using a computing device such as a laptop computer or a tablet computer) a new customer device 140, the user may connect to a web site (e.g., hosted by the manufacturer of the customer device 140) and the user may be notified that the operation of the customer device 140 will require the installation of an application on the local area network router 135. If the user consents to this installation, a request to install the application may be sent (e.g., from a customer computing device operated by the user) to the local area network router 135, and, in response, the local area network router 135 may download and install the application on the local area network router 135. Prior to accepting the application, the local area network router 135 may communicate directly with the user (e.g., through a web page hosted directly by the local area network router 135) to ensure that the user has in fact consented to the installation of the application.

Additional safeguards may be employed to prevent the installation of applications that may not be beneficial to the user (e.g., applications containing malicious code). For example, the local area network router 135 may download and install only suitably signed applications. Each application may be signed using a master private key (e.g., a private key under the control of the manufacturer of the local area network router 135, or under the control of another suitable entity, e.g., the operator of the edge router 125 and the edge servers 130), or using a private key signed using the master private key. The local area network router 135 may have a public key with which it may verify, or "authenticate" any such signature that it receives.

As another example of a safeguard for the installation of applications, the local area network router 135 may be configured to accept downloaded applications only from a set address (e.g., a set IP address or an IP address corresponding to a set domain name), which may be programmed into the local area network router 135 at the time of manufacture. An entity having control over this address may then institute a procedure for vetting (e.g., testing for malicious code) each application before it is made available for download.

In some examples, an application may be pushed to the local area network router 135 instead of being downloaded in response to a user action. For example, when the customer device 140 first contacts the registration server 120, the registration server 120 may query the local area network router 135 to determine whether it has the application needed to act as a proxy between the customer device 140 and an edge server 130 for a particular service, and, if it does not, the registration server 120 may attempt to push, or may instruct another server (e.g., the edge server 130) to push, the application to the local area network router 135. Applications installed in this manner may be subject to the same safeguards (or similar safeguards) as those downloaded and installed in response to a user action; for example, they may be signed, they may be installed only after user consent is received, and they may be installed only from a set address.

Applications installed on the local area network router 135 may, as discussed above, make possible the establishing of server-initiated, indirect connections between customer devices 140 and edge servers 130 through the local area network router 135, as discussed above. Such applications may also enable the local area network router 135 to provide, to customer devices 140, various other services, such as a Domain Name Service (DNS), a Dynamic Host Configuration Protocol (DHCP) service, a time service, a Session Initiation Protocol (SIP) service, a Lightweight Directory Access Protocol (LDAP) service, or a Virtual Private Network (VPN) service. Such applications may also make it possible for the local area network router 135 to enforce a bandwidth limit in the connection between the customer device 140 and the local area network router 135, or in the connection between the local area network router 135 and the edge server 130. Such applications may also make it possible to provide services to devices connected (e.g., through the wide area network) to the wide area network side of the local area network router 135; for example, such an application may make it possible for the local area network router 135 to host a publicly accessible web page. Such applications may also make it possible for certain off-line services to be provided by the local area network router 135 when a WAN-side connection to edge server 130 becomes unavailable. For example, if a customer device 140 regularly uploads information to an edge server (through the proxy procedure discussed), or if a connection through ISP 115 from local area network router 135 is lost, the application on the local area network router may temporarily store the information and upload it after WAN-side connectivity is restored. Because, to the customer device 140, the connection ends at the local area network router 135, the customer device 140 (which may have limited memory) will consider the attempted transactions to have been completed, and need not retry any failed transactions.

Figure 2A:
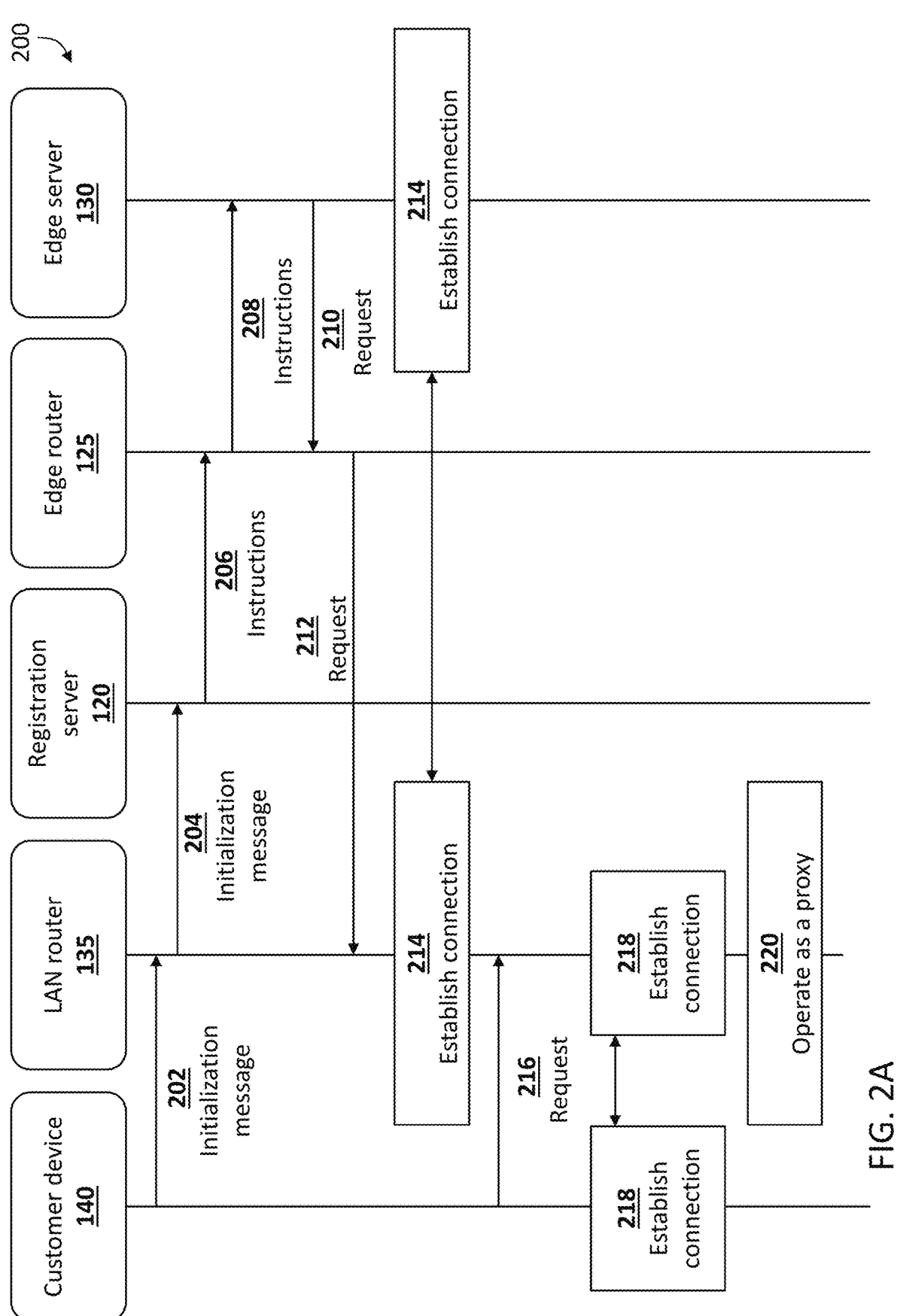
FIG. 2A is a flow chart of a first portion of a method, according to an example of the present disclosure.

FIG. 2A depicts a first portion of an example method 200 in which aspects of the present technology may be practiced by one or more of a customer device 140, a local area network router (or LAN router) 135, a registration server 120, an edge router 125, and an edge server 130. Although particular acts and functions may be described in FIG. 2A is being performed by particular system(s) (such as customer device 140, a local area network router (or LAN router) 135, a registration server 120, an edge router 125, and an edge server 130), the functions/acts may, in other examples, be performed by a different one of such system(s), in whole or in part. As discussed, at 202, the customer device 140 may send an initialization message to the local area network router 135, which may forward it, at 204, to the registration server 120. The registration server 120, upon receiving the initialization message, may send, at 206, instructions to the edge router 125, which may forward the instructions, at 208, to the edge server 130, the instructions instructing the edge server 130 to establish a connection with the customer device 140 or with the local area network router 135. The edge server 130 may then, at 210, send a connection request to the edge router 125, which may, at 212 forward the request to the local area network router 135. For example, the connection request from the edge server 130 may be to the customer device 140 (based on the instructions received from the registration server 120), and an application installed at the LAN router 135 may intercept the request. In other examples, the instructions from the registration server 120 may cause the edge server 130 to request a connection (e.g., a TCP connection) with the LAN router on a port specified in the initialization message 204 and/or in the instructions 208 received at the edge server. In the latter case, the LAN router 135 may be programmed to correlate that particular port with a the customer device 140 that sent the initialization message 202.

In response, the local area network router 135 may establish, at 214, a TCP connection between the local area network router 135 and the edge server 130. In examples, a second connection (e.g., a second TCP connection) may be established between the LAN router 135 and the particular customer device 140 that sent the initialization message 202. As discussed, an application operating on LAN router 135 may initiate the TCP three-way handshake to establish the second connection. In other examples, the LAN router 135 may send instructions to the customer device 140 to initiate the connection sequence. For example, in the particular example of FIG. 2A, the customer device 140 may also send, at 216, a connection request to the local area network router 135, which may establish a second connection, at 218, between the LAN router 135 and the customer device 140. The local area network router 135 may then, at 220, operate as a proxy between the customer device 140 and the edge server 130.

Figure 2B:
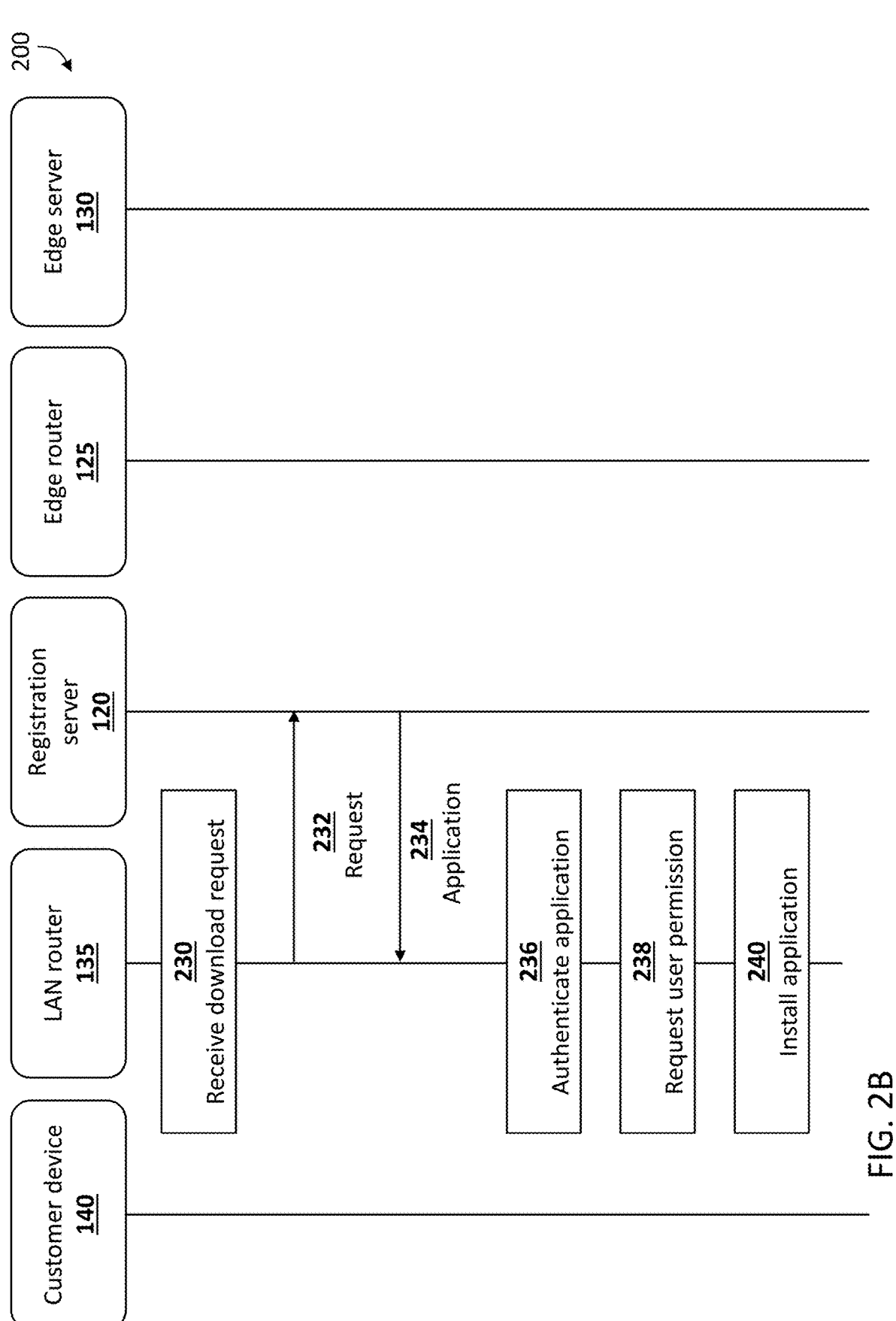
FIG. 2B is a flow chart of a second portion of a method, according to an example of the present disclosure.

FIG. 2B depicts a second portion of an example method 200. In the portion depicted, the local area network router 135 downloads and installs an application, which in this example is stored on the registration server 120. At 230, the local area network router 135 receives a request (e.g., from a user or from the registration server 120) to download an application. For example, in response to receiving (at 204 in FIG. 2A) the initialization message, the registration server 120 may query the local area network router 135 to determine whether it already has the application installed, and if it does not, the registration server 120 may send the request (the request to download the application) to the local area network router 135. In some examples, the local area network router 135 does not receive a request, but instead the local area network router 135 (i) determines, at the time of forwarding (e.g., at 204 in FIG. 2A) the initialization message from the customer device 140, or at the time of receiving (e.g., at 212 in FIG. 2A) the connection request from the edge server 130, that it lacks an application needed to operate as a proxy between the customer device 140 and the edge server 130, and (ii) takes steps to download and install the application. In other examples, operation 230 is initiated based on a request from a different customer device 140 than sent the initialization message 202. As discussed, multiple proxy applications may be run on the LAN router 135, each being specific to a different type or manufacturer of customer devices 140. At 232, the local area network router 135 sends a request for the application to the registration server 120, and at 234, the registration server 120 sends the application to the local area network router 135. The local area network router 135 authenticates the application at 236 (e.g., by verifying that it has been cryptographically signed with the correct private key), it requests and obtains permission to install the application from a user, at 238, and, at 240, it installs the application.

FIG. 2C is a flowchart of a method which may be performed by a network switching device (e.g., by the local area network router 135), in some examples. The method includes receiving, at 242, a TCP connection request, from a first device, on the wide area network. In examples, the connection request may be a TCP connection request made by an edge server 130, in response to instructions the edge server 130 may have previously received from a registration server 120.

The method further includes determining, at 244, that the TCP connection request is related to a second device, on the local area network. In examples, as discussed, a LAN router (such as LAN router 135) may receive an initialization message from a customer device (e.g., customer device 140) relating to a service provided on a server, such as edge server 130. The LAN router 135 may store an association between the requesting customer device 140 and a particular port of the LAN router 135. The LAN router may then identify that particular port to the registration server 120 when forwarding the initialization message. The registration server 120, in examples, may then send instructions to the edge server 130 (e.g., through edge router 125) to initiate a TCP connection to the identified particular port of the LAN router 135. When the request for the TCP connection is thereafter received at the LAN router 135 from the edge server 130, the LAN server 135 is able to determine that the request is related to the particular customer device 140 that sent the initialization message (e.g., by correlating the port on which the TCP connection request was received). In other examples, the TCP connection request may actually be addressed to the second device (such as customer device 140), and an application on the LAN router 135 may be programmed to intercept the request and, rather than forwarding the request to the customer device 140, act as a proxy for the customer device 140 while causing two TCP connections to be created instead (as detailed below). Other methods for the LAN router to correlate a particular customer device 140 to a TCP connection request from a server (e.g., through other mappings of device identifiers) are possible and contemplated.

The method further includes causing to be created, at 246, a first TCP connection between the network switching device and the first device and a second TCP connection between the network switching device and the second device. As used herein, "causing to be created" a connection (such as a TCP connection) may include either participating as the initiating device or the responding device in a handshake protocol, such as the three-way handshake of a TCP connection sequence. For example, the LAN router 135 may cause to be created the first TCP connection by responding to the first TCP connection request (e.g., a SYN message) from an edge router 130 (including sending a SYN/ACK response to the first TCP connection request). In other examples, the LAN router 135 may also "cause to be created" the second TCP connection by sending to the second device (e.g., the customer device 140) a SYN message, receive the SYN/ACK response from the second device, and then send an ACK message to the second device to complete the three-way handshake. In other examples, the LAN router 135 may cause the second TCP connection to be created by sending, to the customer device 140, instructions instructing the customer device 140 to initiate the second TCP connection (with a SYN message addressed to a specified address and port number, the address being a LAN-side address of the LAN router 135).

The method further includes receiving, at 248, a request to download an application. The request may originate from a third device, which may be, for example, the registration server 120, or the edge server 130, or a device on the LAN side of the local area network (LAN) router 135, such as a computing device operated by a user, who may be performing setup of the customer device 140 or of the local area network router 135. As discussed, the request to download an application at operation 248, may be from a different customer device 140 in some examples.

The method further includes requesting, at 250, permission from a user to download the application. The local area network router 135 may request such permission as a security measure, to reduce the risk that the application may be malicious or otherwise unauthorized. The request may be made through a user portal, user interface, or other means.

The method further includes downloading, at 252, the application. The application may be downloaded from a suitable server, e.g., from the edge server 130 or from the registration server 120.

The method further includes authenticating, at 254, the application. The authenticating may involve, for example, decrypting a signature associated with the application using a suitable public key, to verify that the application has been signed by a suitable authority.

The method further includes receiving, at 256, a second TCP connection request, from a third device, on the wide area network, related to a fourth device, on the local area network. This connection request may be, e.g., from the same edge server 130, or from another edge server, and it may be for another customer device 140.

The method further includes establishing, at 258, a third TCP connection, with the third device. This connection between the local area network router 135 and the third device may be analogous to the connection between the local area network router 135 and the first device.

The method further includes establishing, at 260, a fourth TCP connection, with the fourth device. This connection between the local area network router 135 and the fourth device may be analogous to the connection between the local area network router 135 and the second device.

The method further includes operating, at 262, as a proxy for forwarding packets exchanged between the third device and the fourth device. For example, with the establishment of these TCP connections, the local area network router 135 may operate as a proxy both (i) between the first device and the second device and (ii) between the third device and the fourth device.

The method further includes providing, at 264, a service, to the second device, the service being selected from the group consisting of a Domain Name Service (DNS), a Dynamic Host Configuration Protocol (DHCP) service, a time service, a Session Initiation Protocol (SIP) service, a Lightweight Directory Access Protocol (LDAP) service, and a Virtual Private Network (VPN) service. Such services may be of use to various customer devices, and it may be possible for the local area network router 135 to provide these services with lower latency (or with lower cost) than, e.g., servers on the WAN side of the local area network router 135.

The method further includes enforcing, at 266, a bandwidth limit in the first TCP connection, between the network switching device and the first device, and in a second TCP connection, between the network switching device and the second device. Such a bandwidth limit may be a mechanism by which the ability of the customer device 140, if it has been compromised, to burden other devices, may be constrained.

FIG. 2D is a flowchart of a method, which may be performed by an edge server 130, in some examples. The method includes receiving, at 268, an instruction to establish a connection with a first device (e.g., a customer device 140), the first device being connected to a local area network, the local area network being connected to the wide area network through a first network switching device (e.g., a local area network router 135).

The method further includes sending, at 270, a connection request to the first network switching device. This connection request may result in the forming of a connection between the edge server 130 and the local area network router 135, which may, when the local area network router 135 is connected to the customer device 140, enable the local area network router 135 to operate as a proxy between the customer device 140 and the edge server 130.

The method further includes receiving, at 272, a connection request. In examples, this connection request may be, e.g., from a customer device 140 that has been compromised by a malicious actor and that is being used to attempt to attack the edge server 130.

The method further includes declining, at 274, the connection request without regard to an origin of the request. In some examples, the operation of a local area network router 135 as a proxy between edge servers and customer devices makes it possible for the edge server 130 to initiate connections (e.g., with the local area network router 135) and to decline all attempts by other devices to initiate a connection with the edge server 130. For example, the edge server 130 may be programmed to reject all SYN messages that are the first message in a TCP three-way handshake. In this manner, the edge server 130 may be protected from SYN attacks that force the edge server to use resources while awaiting a response (e.g., the final ACK message of the TCP three-way handshake) to open connection requests.

In some examples, the denial of SYN messages or other connection requests can be offloaded to the edge router 125. For example, the illustrated method further includes receiving, at 276, by a network switching device (e.g., by the edge router 125), a connection request addressed, e.g., to the edge server 130. Such a connection request may be, e.g., from a customer device 140 that has been compromised by a malicious actor and that is being used to attempt to attack the edge server 130.

The method further includes not forwarding, at 280, e.g., by the edge router 125, the connection request to the first server (e.g., to the edge server 130). In this situation, the edge router 125 may be configured to protect the edge server 130 by declining to forward, to the edge server 130, any connection requests (in addition to, or instead of, the edge server 130 declining to respond to any such requests that it may receive).

FIG. 2E is a flowchart of a method, which may be performed by a network switching device (e.g., by the local area network router 135), in some examples. The method includes receiving, at 282, an initiation message from a first device (e.g., from a customer device 140), on the local area network. This initialization message may be received by the local area network router 135.

The method further includes transmitting, at 284, the initiation message to a second device, on the wide area network. In this operation, the local area network router 135 may transmit the initialization message to, e.g., the registration server 120. In some examples, the initialization message may be forwarded as is. In other examples, it may be prepended with information about the capabilities of the LAN router 135 that can be used by the registration server 120 to determine whether the LAN router 135 is capable of operating as a proxy for the customer device 140.

The method further includes receiving, at 286, a connection request from a third device, on the wide area network. For example, the local area network router 135 may receive a connection request from an edge server 130. This connection, once established, may be one of two connections (the other being a connection between the local area network router 135 and the customer device 140) allowing the local area network router 135 to operate as a proxy between the edge server 130 and the customer device 140.

The method further includes sending, at 288, to the first device, instructions to establish a connection with the network switching device, on a local area network side of the network switching device. These instructions may be sent to the customer device 140, to cause it to initiate a connection with the local area network router 135.

The method further includes receiving, at 290, a connection request from the first device. This connection request may be sent to the local area network router 135 in response to the instructions.

The method further includes operating, at 292, as a proxy for forwarding packets exchanged between the first device and the third device. With the establishment of these connections, the local area network router 135 may operate both as (i) a proxy between the first device and the second device, and as (ii) a proxy between the third device and the fourth device.

Figure 3:
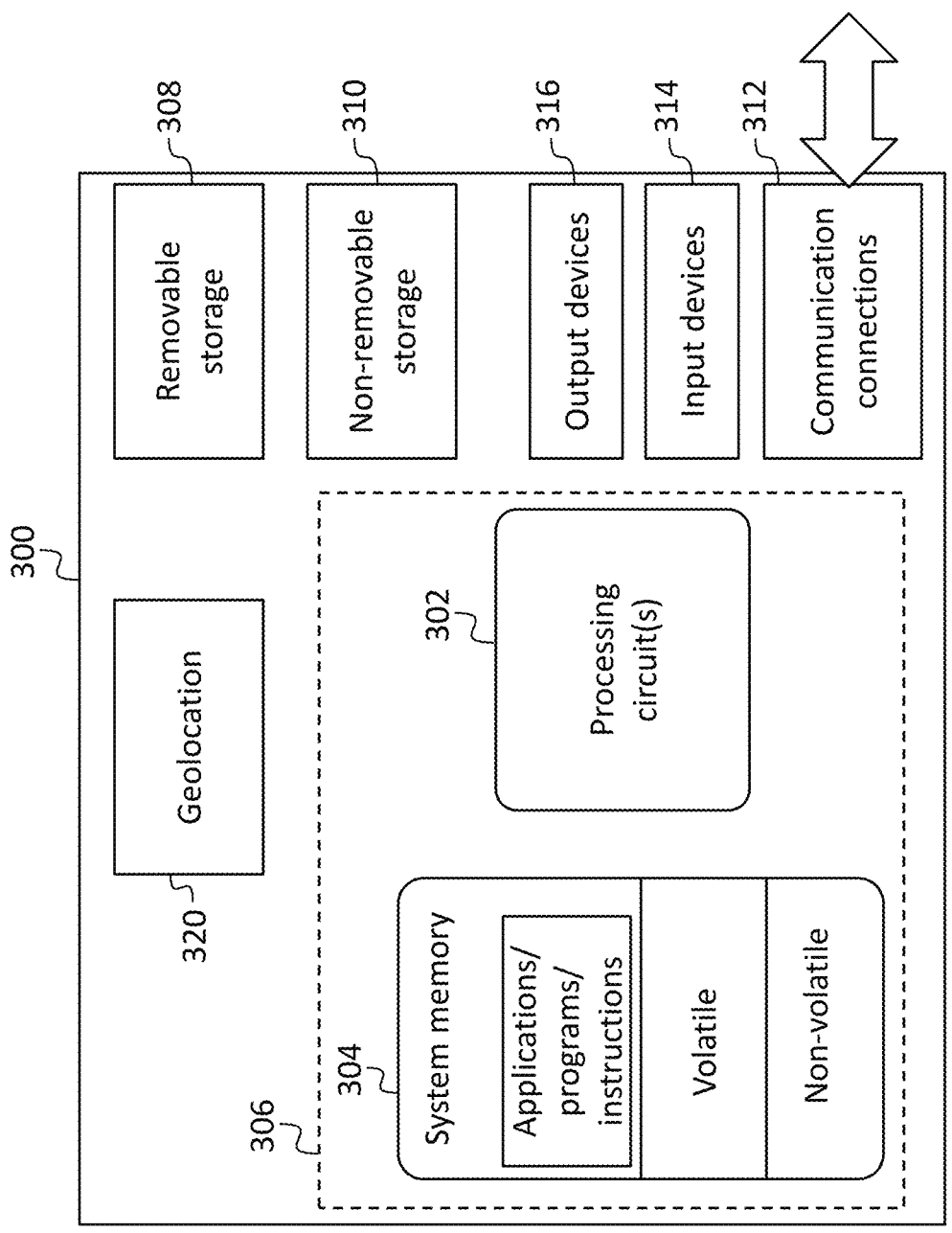
FIG. 3 is a block diagram of an operating environment, according to an example of the present disclosure.

FIG. 3 depicts an example of a suitable operating environment 300, portions of which may be used to implement the local area network router 135, the customer device 140, the edge router 125, the edge server 130, the registration server 120, or other devices that may include computing functionality within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and tangible and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

Aspects of the present invention, for example, are described above with reference to block diagrams and/or operational illustrations of methods, systems, and computer program products according to aspects of the invention. Systems depicted as blocks may be communicatively connected to one or more other systems described, whether or not such connection(s) is/are drawn as such. The functions/ acts noted in the blocks may occur out of the order as shown in any flowchart, and any functions/acts described as performed by one system may, in examples, be performed by one or more other system(s), in whole or in part. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

Although exemplary embodiments of systems and methods for customer control of edge service have been specifically described and illustrated herein, many modifications and variations will be apparent to those skilled in the art. Accordingly, it is to be understood that systems and methods for customer control of edge service constructed according to principles of this disclosure may be embodied other than as specifically described herein. The invention is also defined in the following claims, and equivalents thereof.

What is claimed is:

1. A system, comprising:
a network switching device operably connected to a wide area network and to a local area network, the network switching device comprising:
at least one processing circuit; and
memory, operatively connected to the at least one processing circuit and storing instructions that, when executed by the at least one processing circuit, cause the system to perform a method, the method comprising:
receiving a transmission control protocol (TCP) connection request, from a first device, on the wide area network;
determining that the TCP connection request is related to a second device, on the local area network;
in response to the TCP connection request:
causing a first TCP connection to be created between the network switching device and the first device; and

16 causing a second TCP connection, separate from the first TCP connection, to be created between the network switching device and the second device;
receiving a request to download an application;
downloading the application; and
authenticating, by the network switching device, the application.

2. The system of claim 1, wherein the method further comprises:
receiving a second TCP connection request, from a third device, on the wide area network, related to a fourth device, on the local area network,
causing a third TCP connection to be established with the third device,
causing a fourth TCP connection to be established with the fourth device, and
operating as a proxy for forwarding packets exchanged between the third device and the fourth device.

3. The system of claim 2, wherein:
the first TCP connection, between the network switching device and the first device, uses a first port of the network switching device, the first port corresponding to the second device; and
the third TCP connection uses a second port of the network switching device, the second port corresponding to the fourth device,
the second port being different from the first port.

4. The system of claim 3, wherein the third device is the same device as the first device.

5. The system of claim 1, wherein the method further comprises receiving the request to download the application from a third device, on the local area network.

6. The system of claim 1, wherein the method further comprises receiving the request to download the application from a third device, on the wide area network.

7. The system of claim 1, wherein the method further comprises requesting, by the network switching device, permission from a user to download the application.

8. The system of claim 1, wherein the method further comprises downloading, by the network switching device, the application from a set address on the wide area network.

9. The system of claim 1, wherein the method further comprises providing a service, by the network switching device to the second device, the service being selected from the group consisting of a Domain Name Service (DNS), a Dynamic Host Configuration Protocol (DHCP) service, a time service, a Session Initiation Protocol (SIP) service, a Lightweight Directory Access Protocol (LDAP) service, and a Virtual Private Network (VPN) service.

10. The system of claim 1, wherein the method further comprises enforcing, by the network switching device, a bandwidth limit in the first TCP connection, between the network switching device and the first device, and in the second TCP connection, between the network switching device and the second device.

11. A system, comprising:
a network switching device operably connected to a wide area network and to a local area network, the network switching device comprising:
at least one processing circuit; and
memory, operatively connected to the at least one processing circuit and storing instructions that, when executed by the at least one processing circuit, cause the system to perform a method, the method comprising:
receiving an initiation message from a first device, on the local area network;

transmitting the initiation message to a second device, on the wide area network, wherein the second device is a registration server;

receiving a first connection request for the first device from a third device, on the wide area network;

in response to the connection request, sending, to the first device, instructions to establish a second connection, separate from a first connection, with the network switching device, on a local area network side of the network switching device;

receiving a request to download an application;

downloading the application; and authenticating the application.

12. The system of claim 11, wherein the third device is an edge server.

13. The system of claim 11, wherein the method further comprises:

enforcing, by the network switching device, a bandwidth limit in between the network switching device and the third device and between the network switching device and the first device.

14. The system of claim 11, wherein the method further comprises:

receiving a second connection request from the first device; and operating as a proxy for forwarding packets exchanged between the first device and the third device.

* * * * *